US012578183B2

(12) United States Patent
Nakamura et al.

(10) Patent No.: US 12,578,183 B2
(45) Date of Patent: *Mar. 17, 2026

(54) FILM THICKNESS MEASURING DEVICE AND FILM THICKNESS MEASURING METHOD

(71) Applicant: HAMAMATSU PHOTONICS K.K., Hamamatsu (JP)

(72) Inventors: Tomonori Nakamura, Hamamatsu (JP); Kenichi Ohtsuka, Hamamatsu (JP); Satoshi Arano, Hamamatsu (JP); Kunihiko Tsuchiya, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 16 days.

This patent is subject to a terminal disclaimer.

(21) Appl. No.: 17/797,193

(22) PCT Filed: Feb. 9, 2021

(86) PCT No.: PCT/JP2021/004743
§ 371 (c)(1),
(2) Date: Aug. 3, 2022

(87) PCT Pub. No.: WO2021/161986

PCT Pub. Date: Aug. 19, 2021

(65) Prior Publication Data

US 2023/0058064 A1 Feb. 23, 2023

(30) Foreign Application Priority Data

Feb. 13, 2020 (JP) ................................ 2020-022724

(51) Int. Cl.
G01B 11/06 (2006.01)
G01B 15/02 (2006.01)
(Continued)

(52) U.S. Cl.
CPC .......... G01B 11/06 (2013.01); G01B 11/0608 (2013.01); G01B 11/0633 (2013.01);
(Continued)

(58) Field of Classification Search
CPC . G01B 11/06; G01B 11/0608; G01B 11/0633; G01B 11/0691; G01B 15/02;
(Continued)

(56) References Cited

U.S. PATENT DOCUMENTS 5,726,756 A 3/1998 Aki et al.
7,061,601 B2 6/2006 Meeks
(Continued)

FOREIGN PATENT DOCUMENTS

CN 201993103 U 9/2011
CN 102252762 A 11/2011
(Continued)

OTHER PUBLICATIONS

International Preliminary Report on Patentability mailed Aug. 25, 2022 for PCT/JP2021/003768.
(Continued)

*Primary Examiner* — Sunghee Y Gray
(74) *Attorney, Agent, or Firm* — Faegre Drinker Biddle & Reath LLP

(57) ABSTRACT

A film thickness measuring apparatus includes a light irradiation unit configured to irradiate an object with light in a planar shape, an optical element having a transmittance and a reflectance changing according to wavelengths in a predetermined wavelength range, the optical element being configured to separate light from the object by transmitting and reflecting the light, an imaging unit configured to photograph light separated by the optical element, and an analysis unit configured to estimate a film thickness of the object based on a signal from the imaging unit photograph-
(Continued)

ing light, in which the light irradiation unit emits light having a wavelength included in the predetermined wavelength range of the optical element.

6 Claims, 13 Drawing Sheets

(51) Int. Cl.
  *G01J 3/02* (2006.01)
  *G01J 9/00* (2006.01)
  *G02B 27/14* (2006.01)
(52) U.S. Cl.
  CPC .......... *G01B 11/0691* (2013.01); *G01B 15/02* (2013.01); *G01J 3/027* (2013.01); *G01J 9/00* (2013.01); *G02B 27/141* (2013.01)
(58) Field of Classification Search
  CPC .... G01J 3/027; G01J 3/36; G01J 9/00; G01N 21/8422; G01N 21/9501; G02B 27/141
  USPC ......................................................... 356/630
  See application file for complete search history.

(56) References Cited

U.S. PATENT DOCUMENTS

| | | | |
|---|---|---|---|
| 9,587,930 B2 | 3/2017 | Srocka | |
| 10,499,662 B1 | 12/2019 | Kristensen et al. | |
| 2002/0127950 A1* | 9/2002 | Hirose .................... B24B 49/04 | |
| | | | 451/6 |
| 2005/0094160 A1 | 5/2005 | Murai et al. | |
| 2006/0126170 A1 | 6/2006 | Yamashita et al. | |
| 2008/0068722 A1 | 3/2008 | Chow | |
| 2009/0316258 A1 | 12/2009 | Uhl | |
| 2010/0183188 A1 | 7/2010 | Straehle et al. | |
| 2012/0097864 A1 | 4/2012 | Takahashi et al. | |
| 2014/0355006 A1 | 12/2014 | Hotta | |
| 2015/0350588 A1 | 12/2015 | Lim et al. | |
| 2016/0103311 A1 | 4/2016 | Ito et al. | |
| 2018/0038682 A1 | 2/2018 | Smith et al. | |
| 2018/0321136 A1 | 11/2018 | Ostermeyer | |
| 2019/0250078 A1* | 8/2019 | Braun .................. G01N 1/2813 |

FOREIGN PATENT DOCUMENTS

| | | | |
|---|---|---|---|
| CN | 102346363 A | 2/2012 | |
| CN | 102564588 A | 7/2012 | |
| CN | 103558221 A | 2/2014 | |
| CN | 103620340 A | 3/2014 | |
| CN | 104880258 A | 9/2015 | |
| CN | 105278228 A | 1/2016 | |
| CN | 106052871 A | 10/2016 | |
| CN | 107110640 A | 8/2017 | |
| CN | 107407748 A | 11/2017 | |
| CN | 110381230 A | 10/2019 | |
| CN | 110487192 A | 11/2019 | |
| CN | 110500963 A | 11/2019 | |
| DE | 10160623 A1 | 6/2003 | |
| DE | 102015218720 A1 | 9/2016 | |
| EP | 2076733 B1 | 12/2012 | |
| JP | S59-178304 A | 10/1984 | |
| JP | S62-011128 A | 1/1987 | |
| JP | H07-027520 A | 1/1995 | |
| JP | H10-047926 A | 2/1998 | |
| JP | 2001-108420 A | 4/2001 | |
| JP | 2002196223 A * | 7/2002 | ......... G03F 7/70633 |
| JP | 2003-014422 A | 1/2003 | |
| JP | 2004-069651 A | 3/2004 | |
| JP | 2006-276840 A | 10/2006 | |
| JP | 2007-101399 A | 4/2007 | |
| JP | 2008-039750 A | 2/2008 | |
| JP | 2008-175742 A | 7/2008 | |
| JP | 2008-292240 A | 12/2008 | |
| JP | 2009-115474 A | 5/2009 | |
| JP | 2009-145279 A | 7/2009 | |
| JP | 2009-287979 A | 12/2009 | |
| JP | 2010025671 A * | 2/2010 | |
| JP | 2011-027706 A | 2/2011 | |
| JP | 2011-039005 A | 2/2011 | |
| JP | 2011226876 A * | 11/2011 | |
| JP | 2012-137394 A | 7/2012 | |
| JP | 2014-235332 A | 12/2014 | |
| JP | 2014-235333 A | 12/2014 | |
| JP | 2015-211727 A | 11/2015 | |
| JP | 2016-031444 A | 3/2016 | |
| JP | 2017-009523 A | 1/2017 | |
| JP | 2017015526 A | 1/2017 | |
| JP | 2017-078724 A | 4/2017 | |
| JP | 2017-137394 A | 8/2017 | |
| JP | 6285597 B1 | 2/2018 | |
| JP | 2018-116032 A | 7/2018 | |
| JP | 2016-024137 A | 10/2018 | |
| JP | 2018-205132 A | 12/2018 | |
| JP | 2019-144217 A | 8/2019 | |
| KR | 20120081024 A | 7/2012 | |
| KR | 20130018164 A | 2/2013 | |
| KR | 20190027333 A | 3/2019 | |
| TW | 200601267 A | 1/2006 | |
| TW | 201015046 A | 4/2010 | |
| TW | 201122415 A | 7/2011 | |
| TW | 201315964 A | 4/2013 | |
| WO | WO-01/001070 A1 | 1/2001 | |
| WO | WO-2009/153067 A2 | 12/2009 | |
| WO | 2012/165400 A1 | 12/2012 | |
| WO | 2016/193037 A1 | 12/2016 | |
| WO | WO-2018/072447 A1 | 4/2018 | |

OTHER PUBLICATIONS

International Preliminary Report on Patentability mailed Aug. 25, 2022 for PCT/JP2021/000041.
International Preliminary Report on Patentability mailed Aug. 25, 2022 for PCT/JP2021/004743.
Office Action issued Feb. 25, 2025 in related U.S. Appl. No. 17/797,206.
Office Action issued on May 27, 2025 in corresponding EP patent application 21753865.1 (6 pages).

* cited by examiner (a)

FILM THICKNESS MEASURING DEVICE AND FILM THICKNESS MEASURING METHOD

TECHNICAL FIELD

An aspect of the present invention relates to a film thickness measuring apparatus and a film thickness measuring method.

BACKGROUND ART

For example, in a semiconductor manufacturing apparatus, etc., it is important to form a uniform film on a wafer surface. When in-plane uniformity of a film thickness value is poor, a failure factor such as a wiring defect, a void occurs, and the yield deteriorates. In this case, it becomes a problem that productivity deteriorates due to an increase in process time and materials. Therefore, in a semiconductor manufacturing apparatus, etc., normally, a film thickness is measured by a point sensor, a line scan (for example, see Patent Literature 1), etc., and it is determined whether or not a desired film thickness distribution is obtained.

CITATION LIST

Patent Literature

Patent Literature 1: Japanese Unexamined Patent Publication No. 2018-205132

SUMMARY OF INVENTION

Technical Problem

Here, in a method of measuring a film thickness by the above-mentioned point sensor, line scan, etc., there is a problem that a measurement time becomes long.

An aspect of the invention has been made in view of the above circumstances, and an object of the invention is to provide a film thickness measuring apparatus and a film thickness measuring method capable of measuring a film thickness at high speed.

Solution to Problem

A film thickness measuring apparatus according to an aspect of the invention includes a light irradiation unit configured to irradiate an object with light in a planar shape, an optical element having a transmittance and a reflectance changing according to wavelengths in a predetermined wavelength range, the optical element being configured to separate light from the object by transmitting and reflecting the light, an imaging unit configured to photograph light separated by the optical element, and an analysis unit configured to estimate a film thickness of the object based on a signal from the imaging unit photographing light, in which the light irradiation unit emits light having a wavelength included in the predetermined wavelength range of the optical element.

In the film thickness measuring apparatus according to the aspect of the invention, the object is irradiated with light having a wavelength included in a predetermined wavelength range of the optical element in a plane shape. Then, in the film thickness measuring apparatus, the optical element separates light from the object by transmitting and reflecting the light. Here, the optical element has the transmittance and reflectance changing according to wavelengths in the predetermined wavelength region. Therefore, a ratio of transmitted light and a ratio of reflected light to light separated by the optical element change depending on the wavelength. Then, the separated light is photographed by the imaging unit, so that the ratio of the transmitted light and the ratio of the reflected light may be specified, and as a result, the wavelength may be specified. Further, in the analysis unit, the film thickness of the object is estimated based on a signal from the imaging unit. When the film thickness can be estimated based on information indicating the wavelength, as described above, the wavelength is specified from a photographing result of the imaging unit, and thus the film thickness of the object can be estimated with high accuracy by considering a signal including information of the wavelength (signal from the imaging unit). Then, in the film thickness measuring apparatus, the object is irradiated with light in a planar shape, and an in-plane film thickness of the object is estimated at the same time according to light from the object. Thus, when compared to the case where the in-plane film thickness is estimated while a light irradiation range is changed by a point sensor, line scan, etc., it is possible to estimate an in-plane film thickness distribution at high speed. As described above, according to the film thickness measuring apparatus according to the aspect of the invention, the film thickness of the object can be measured at high speed.

In the film thickness measuring apparatus, the analysis unit may estimate a film thickness corresponding to each pixel based on wavelength information of each pixel in the imaging unit. According to such a configuration, the film thickness distribution on the irradiation surface of the object may be more specifically estimated (for each pixel).

In the film thickness measuring apparatus, the analysis unit may estimate the film thickness by further considering an angle of light applied to the object. Since the optical path changes when the angle of light applied to the object changes, it may be impossible to estimate the film thickness with high accuracy from information of only the wavelength. In this regard, by further considering the angle of light applied to the object, the film thickness may be estimated with higher accuracy according to the actual optical path.

In the film thickness measuring apparatus, the light irradiation unit may irradiate the object with diffused light. As a result, the surface of the object may be uniformly irradiated with light.

In the film thickness measuring apparatus, the light irradiation unit may have a light guide plate configured to generate diffused light. As a result, the surface of the object may be uniformly irradiated with light using a compact configuration.

The film thickness measuring apparatus may further include a bandpass filter disposed between the optical element and the imaging unit. As a result, light outside a desired wavelength range may be removed, and accuracy of film thickness estimation may be improved.

A film thickness measuring method according to an aspect of the invention includes a first process of irradiating an object with light in a planar shape, a second process of photographing light separated by an optical element, the optical element having a transmittance and a reflectance changing according to wavelengths in a predetermined wavelength range and being configured to separate light from the object by transmitting and reflecting the light, and a third process of deriving a wavelength based on a photographing result and estimating a film thickness of the object based on the wavelength. According to such a film thickness measuring method, similar to the above-mentioned film thickness measuring apparatus, the film thickness of the object may be measured at high speed.

Advantageous Effects of Invention

According to a film thickness measuring apparatus according to an aspect of the invention, a film thickness of an object may be measured at high speed.

BRIEF DESCRIPTION OF DRAWINGS

FIG. 10 is a diagram illustrating a comparison result between the film thickness measuring apparatus according to the present embodiment and a comparative example.

DESCRIPTION OF EMBODIMENTS

Hereinafter, an embodiment of the invention will be described in detail with reference to the drawings. Note that the same or corresponding parts are designated by the same reference symbols in each figure, and duplicate description will be omitted.

Figure 1:
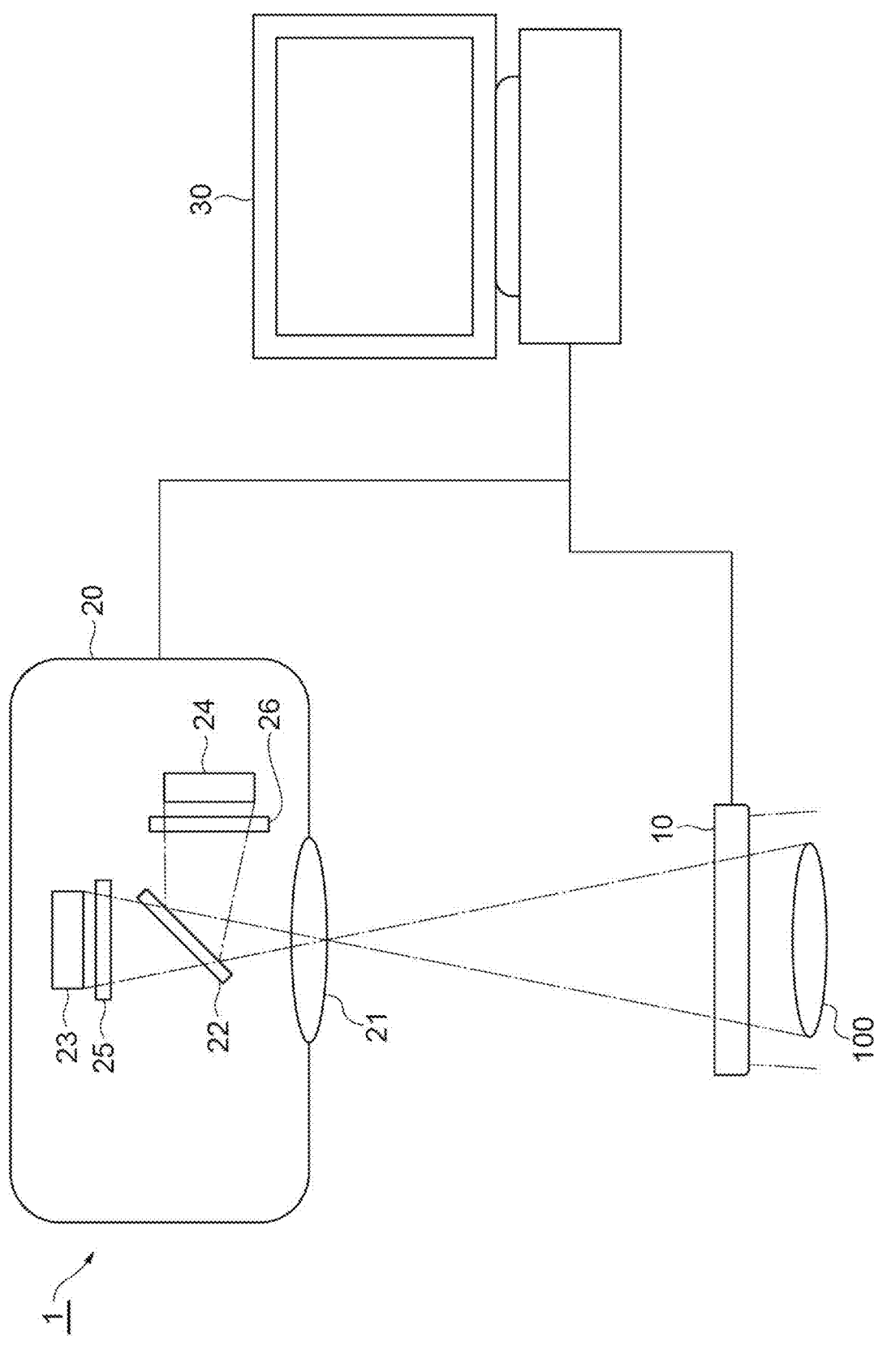
FIG. 1 is a diagram schematically illustrating a film thickness measuring apparatus according to an embodiment of the invention.

FIG. 1 is a diagram schematically illustrating a film thickness measuring apparatus 1 according to the present embodiment. The film thickness measuring apparatus 1 is an apparatus that irradiates a sample 100 (object) with light in a plane shape and measures a thickness of a film formed on the sample 100 based on reflected light from the sample 100. For example, the sample 100 may be a light-emitting element such as an LED, a mini LED, a μLED, an SLD element, a laser element, a vertical laser element (VCSEL), or an OLED, or may be a light-emitting element, an emission wavelength of which is adjusted by a fluorescent substance including nanodots, etc.

As illustrated in FIG. 1, the film thickness measuring apparatus 1 includes a light source 10 (light irradiation unit), a camera system 20, and a control apparatus 30 (analysis unit).

Figure 2:
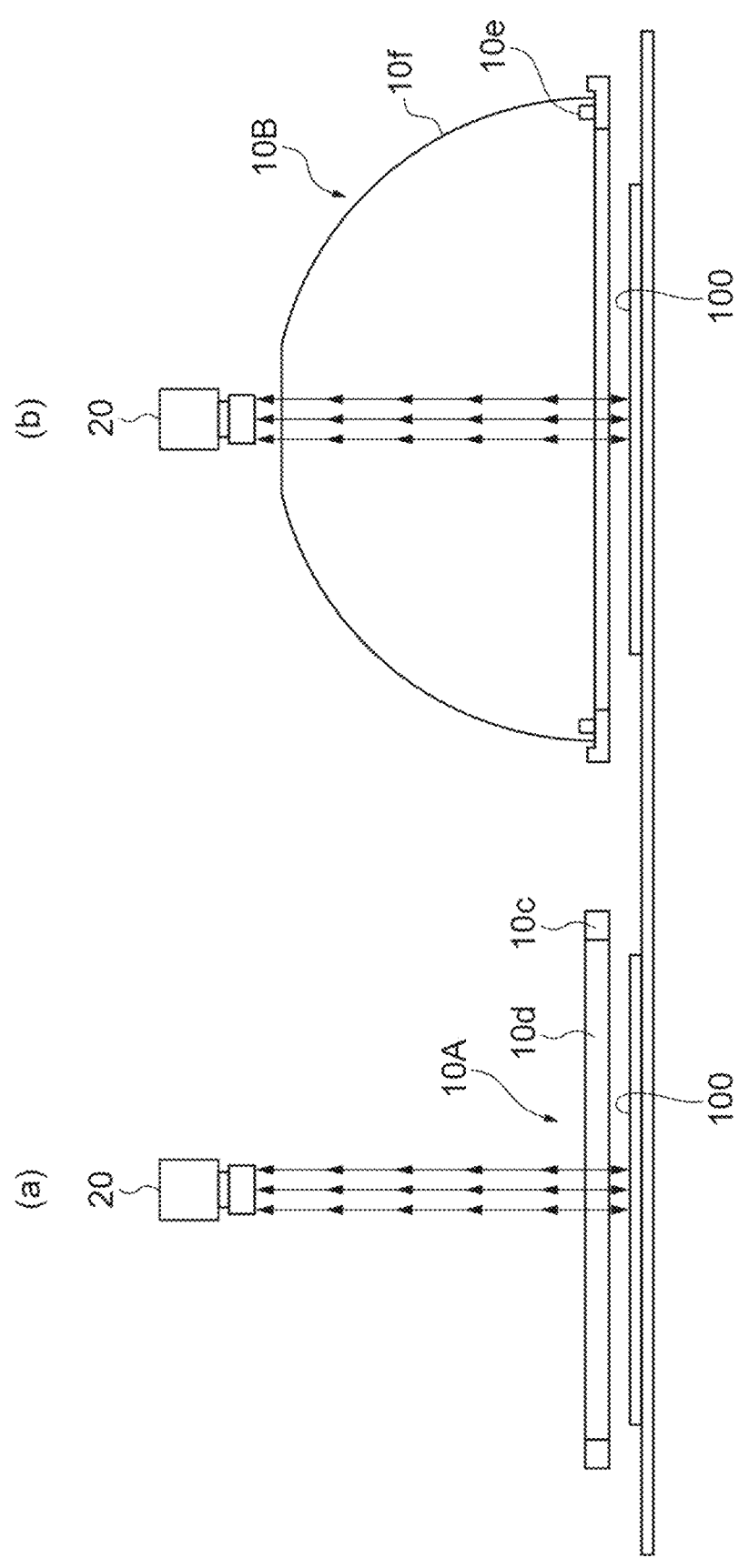
FIG. 2 is a diagram schematically illustrating an example of a light source, in which FIG. 2(*a*) illustrates flat dome lighting, and FIG. 2(*b*) illustrates dome lighting.

The light source 10 irradiates the sample 100 with light in a planar shape. For example, the light source 10 irradiates substantially the entire surface of the sample 100 with light in a planar shape. For example, the light source 10 is a light source capable of uniformly irradiating the surface of the sample 100, and irradiates the sample 100 with diffused light. As illustrated in FIG. 2, the light source 10 may be a so-called flat dome type light source 10A (see FIG. 2(*a*)) or may be a dome type light source 10B (see FIG. 2(*b*)). The light source 10A illustrated in FIG. 2(*a*) has an LED 10c and a light guide plate 10d. The light guide plate 10d generates diffused light according to light emitted from the LED 10c. The diffused light generated by the light guide plate 10d is reflected by the sample 100 and input to the camera system 20. According to such a flat dome type light source 10A, glare may be suppressed while ensuring a sufficient field of view (for example, about 300 mm) The light source 10B has an LED 10e and a dome portion 10f. Light emitted from the LED 10e is applied on an inner surface of the dome portion 10f, diffused light from the inner surface of the dome portion 10f is reflected by the sample 100, and the reflected light by the sample 100 is input to the camera system 20. The light source 10 may be a surface illumination unit using a white LED, a halogen lamp, a Xe lamp, etc.

The light source 10 irradiates the sample 100 with light of a wavelength included in a predetermined wavelength range of an inclined dichroic mirror 22 (details are described later) included in the camera system 20. Although the details will be described later, the inclined dichroic mirror 22 is an optical element that separates light from the sample 100 by transmitting and reflecting the light according to wavelengths. The transmittance and the reflectance of the inclined dichroic mirror 22 change according to wavelengths in the predetermined wavelength range described above.

Figure 3:
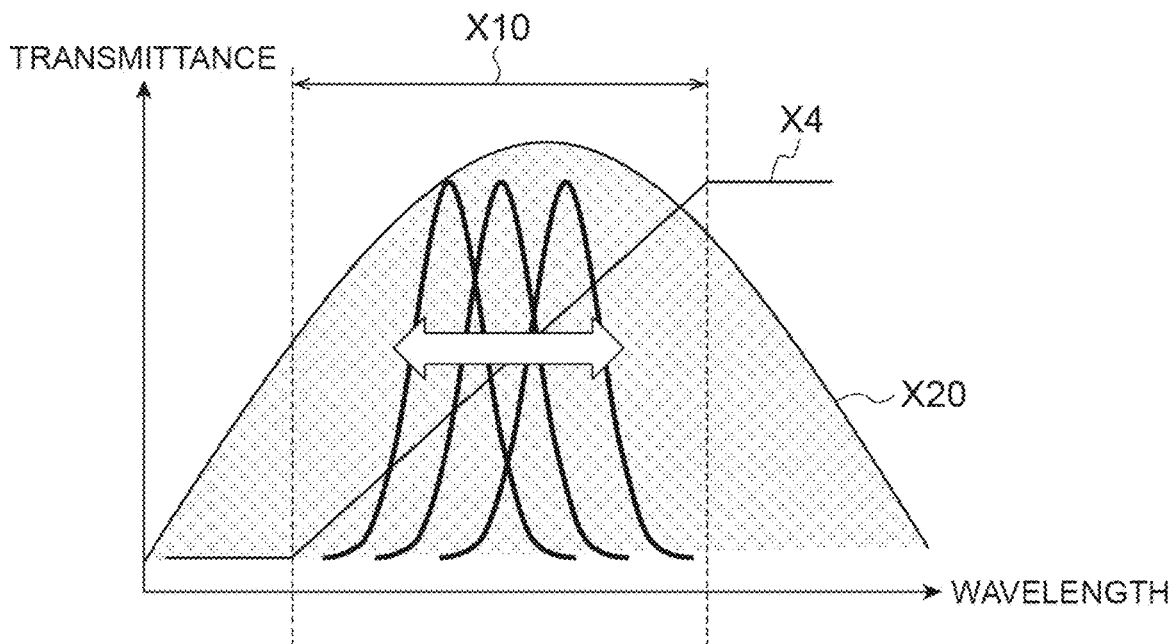
FIG. 3 is a diagram for describing a relationship between characteristics of a dichroic mirror and a wavelength of light emitted from the light source.

FIG. 3 is a diagram for describing a relationship between characteristics of the inclined dichroic mirror 22 and a wavelength of light emitted from the light source 10. In FIG. 3, the horizontal axis indicates a wavelength, and the vertical axis indicates the transmittance of the inclined dichroic mirror 22. As indicated by a characteristic X4 of the inclined dichroic mirror 22 of FIG. 3, in the inclined dichroic mirror 22, the transmittance (and reflectance) of light gently changes according to a wavelength change in a predetermined wavelength range X10, and the transmittance (and reflectance) of light is constant regardless of the wavelength change in a wavelength range other than the specific wavelength range. As illustrated in FIG. 3, light X20 output from the light source 10 includes light having a wavelength included in the predetermined wavelength range X10 described above. That is, the light source 10 outputs light having a broad spectrum including the predetermined wavelength range X10. Note that a wavelength range (interference peak wavelength) related to measurement is determined by a material of a film formed on the sample 100 and a measured film thickness range.

Returning to FIG. 1, the camera system 20 includes a lens 21, the inclined dichroic mirror 22 (optical element), area sensors 23 and 24 (imaging units), and bandpass filters 25 and 26.

The lens 21 is a lens that collects light from the sample 100 on which the light is incident. The lens 21 may be disposed at a previous stage (upstream) of the inclined dichroic mirror 22, or may be disposed in a region between the inclined dichroic mirror 22 and the area sensors 23 and 24. The lens 21 may be a finite focus lens or an infinite focus lens. When the lens 21 is the finite focus lens, a distance from the lens 21 to the area sensors 23 and 24 is set to a predetermined value. When the lens 21 is the infinite focus lens, the lens 21 is a collimator lens that converts light from the sample 100 into parallel light, and is aberration-corrected so that parallel light can be obtained. Light output from the lens 21 is incident on the inclined dichroic mirror 22.

The inclined dichroic mirror 22 is a mirror created using a specific optical material, and is an optical element that separates light from the sample 100 by transmitting and reflecting the light according to wavelengths. The inclined dichroic mirror 22 is configured such that the light transmittance and the reflectance change according to wavelengths in a predetermined wavelength range.

Figure 4:
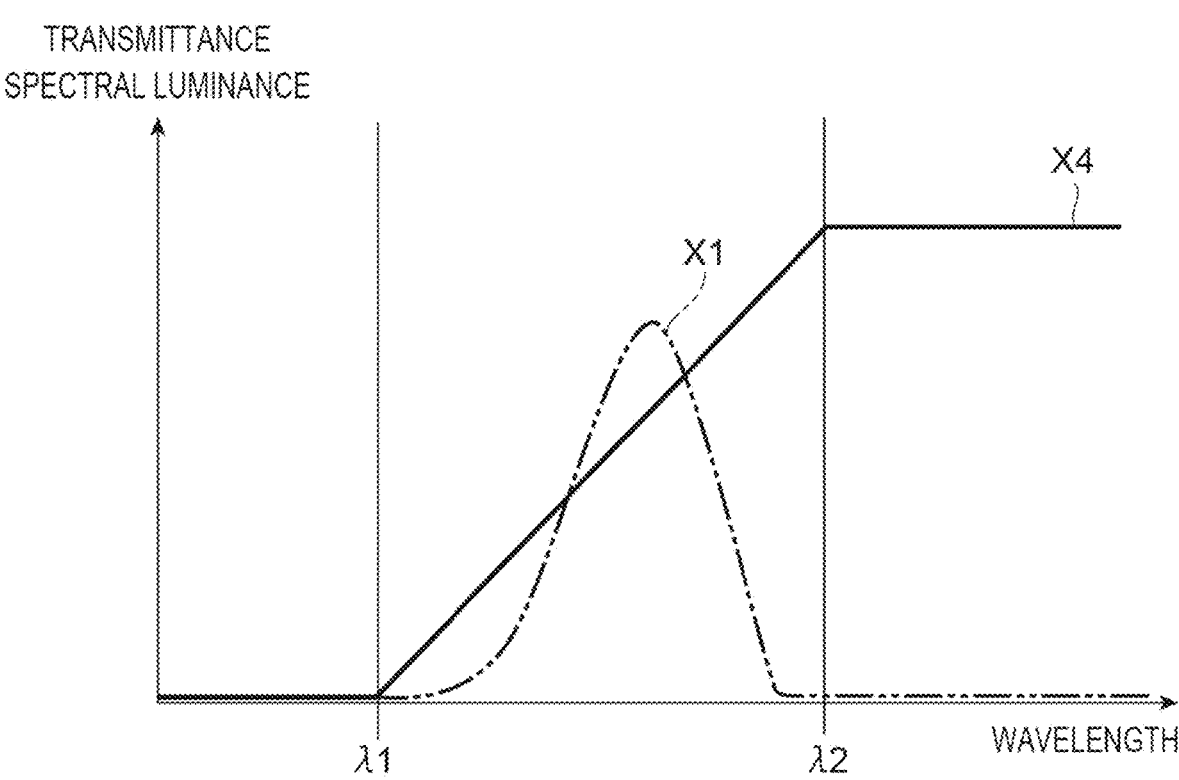
FIG. 4 is a diagram for describing a light spectrum and characteristics of an inclined dichroic mirror.

FIG. 4 is a diagram for describing a light spectrum and characteristics of the inclined dichroic mirror 22. In FIG. 4, the horizontal axis indicates the wavelength, and the vertical axis indicates the spectral intensity (in the case of a spectrum of light) and the transmittance (in the case of the inclined dichroic mirror 22). As indicated by a characteristic X4 of the inclined dichroic mirror 22 of FIG. 4, in the inclined dichroic mirror 22, the transmittance (and reflectance) of light gently changes according to a wavelength change in a predetermined wavelength range (wavelength range of a wavelength $\lambda_1$ to a wavelength $\lambda_2$), and the transmittance (and reflectance) of light is constant regardless of the wavelength change in a wavelength range other than the predetermined wavelength range (that is, a lower wavelength side of the wavelength $\lambda_1$ and a higher wavelength side of the wavelength $\lambda_2$). In other words, in a specific wavelength band (wavelength band of the wavelength $\lambda_1$ to the wavelength $\lambda_2$), the light transmittance increases monotonically (reflectance decreases monotonically) according to the wavelength change. There is a negative correlation between transmittance and reflectance in which, when one changes in a direction of increasing, the other changes in a direction of decreasing. Thus, hereinafter, "transmittance (and reflectance)" may be simply described as "transmittance". Note that "the light transmittance is constant regardless of the wavelength change" includes not only the case where the transmittance is completely constant, but also, for example, the case where the change in transmittance with respect to a wavelength change of 1 nm is 0.1% or less. On the lower wavelength side of the wavelength $\lambda_1$, the light transmittance is approximately 0% regardless of the wavelength change, and on the higher wavelength side of the wavelength $\lambda_2$, the light transmittance is approximately 100% regardless of the wavelength change. Note that "the light transmittance is approximately 0%" includes the case where the transmittance is about 0%+10%, and "the light transmittance is approximately 100%" includes the case where the transmittance is about 100%–10%. In FIG. 4, a waveform X1 indicates a waveform of light output from the light source 10. As indicated by the waveform X1 of FIG. 4, the light output from the light source 10 includes light of a wavelength included in a predetermined wavelength range (wavelength range of the wavelength $\lambda_1$ to the wavelength $\lambda_2$) of the inclined dichroic mirror 22.

The area sensors 23 and 24 photograph light separated by the inclined dichroic mirror 22. The area sensor 23 photograph light transmitted by the inclined dichroic mirror 22. The area sensor 24 photograph light reflected by the inclined dichroic mirror 22. A wavelength range in which the area sensors 23 and 24 have sensitivity corresponds to a predetermined wavelength range in which the light transmittance (and the reflectance) changes according to the change in wavelength in the inclined dichroic mirror 22. The area sensors 23 and 24 are, for example, monochrome sensors or color sensors. Photographing results (images) by the area sensors 23 and 24 are output to the control apparatus 30.

The bandpass filter 25 is disposed between the inclined dichroic mirror 22 and the area sensor 23. The bandpass filter 26 is disposed between the inclined dichroic mirror 22 and the area sensor 24. For example, the bandpass filters 25 and 26 may be filters that remove light in a wavelength range other than the above-mentioned predetermined wavelength range (wavelength range in which the light transmittance and reflectance change according to the wavelengths in the inclined dichroic mirror 22).

Returning to FIG. 1, the control apparatus 30 is a computer, and is physically configured to include a memory such as a RAM or a ROM, a processor (arithmetic circuit) such as a CPU, a communication interface, and a storage unit such as a hard disk. The control apparatus 30 functions by executing a program stored in a memory on a CPU of a computer system. The control apparatus 30 may include a microcomputer or an FPGA.

The control apparatus 30 estimates a film thickness of the sample 100 based on signals from the area sensors 23 and 24 photographing light. The control apparatus 30 estimates a film thickness corresponding to each pixel based on wavelength information of each pixel in the area sensors 23 and 24. More specifically, the control apparatus 30 derives a wavelength center of gravity of light for each pixel based on the amount of transmitted light specified based on a photographing result (signal from the area sensor 23) in the area sensor 23, the amount of reflected light specified based on a photographing result (signal from the area sensor 24) in the area sensor 24, a center wavelength of the inclined dichroic mirror 22 (center wavelength in a predetermined wavelength range), and a width of the inclined dichroic mirror 22, and estimates a film thickness corresponding to each pixel based on the wavelength center of gravity. The width of the inclined dichroic mirror 22 is, for example, a wavelength width from a wavelength at which the transmittance is 0% to a wavelength at which the transmittance is 100% in the inclined dichroic mirror 22.

Specifically, the control apparatus 30 derives the wavelength center of gravity of each pixel based on the following Equation (1). In the following Equation (1), $\lambda$ denotes the wavelength center of gravity, $\lambda_0$ denotes the center wavelength of the inclined dichroic mirror 22, A denotes the width of the inclined dichroic mirror 22, R denotes the amount of reflected light, and T denotes the amount of transmitted light.

$$\lambda = \lambda_0 + A(T-R)/2(T+R) \tag{1}$$

Figure 5:
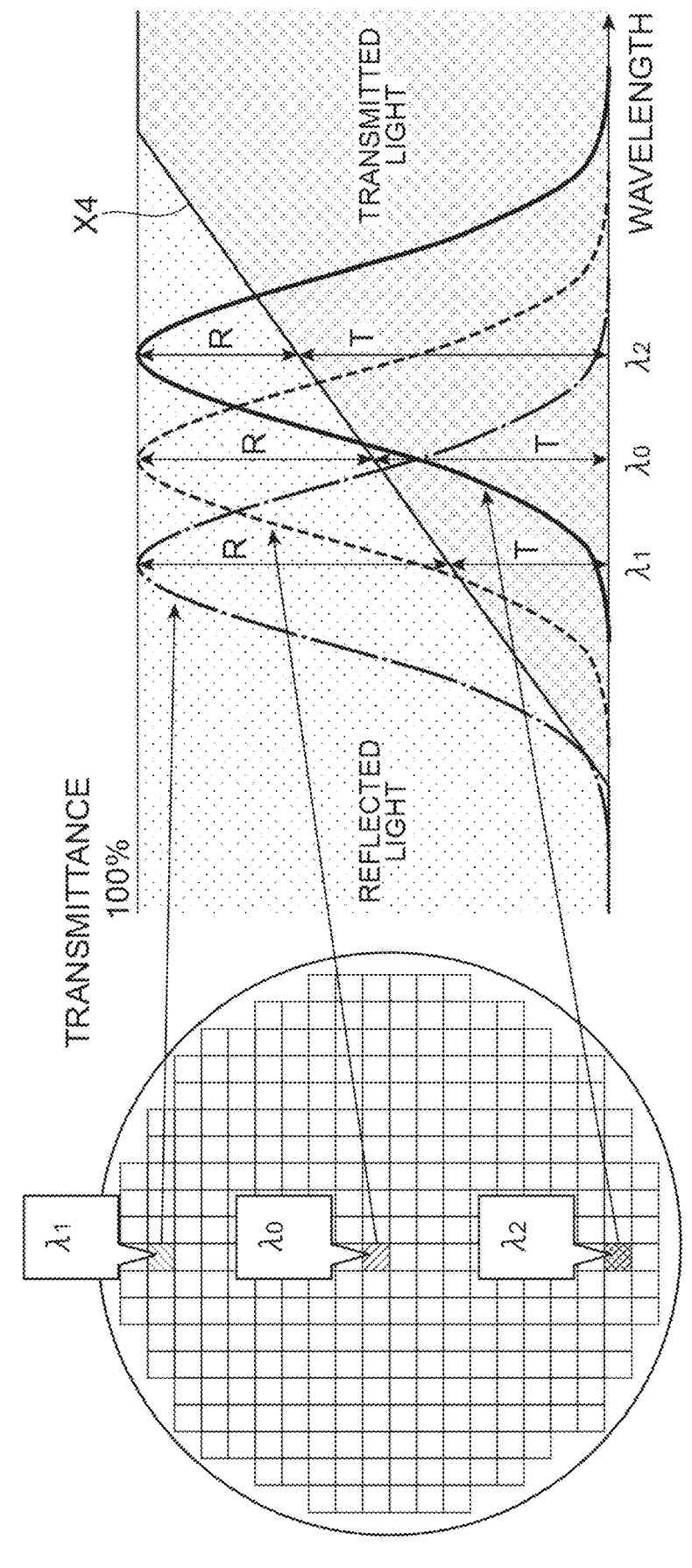
FIG. 5 is a diagram for describing a wavelength shift according to the amount of transmitted light and the amount of reflected light.

FIG. 5 is a diagram for describing a wavelength shift according to the amount of transmitted light and the amount of reflected light. When $\lambda$ (wavelength center of gravity) is derived by the above Equation (1), as illustrated in FIG. 5, for a pixel in which T (amount of transmitted light)=R (amount of reflected light), $\lambda=\lambda_0$ (center wavelength of the inclined dichroic mirror 22). Further, for a pixel in which T<R, that is, a pixel in which the amount of reflected light is larger than the amount of transmitted light, $\lambda=\lambda_1$ (wavelength on the shorter wavelength side of $\lambda_0$). Further, for a pixel in which T>R, that is, a pixel in which the amount of transmitted light is larger than the amount of reflected light, $\lambda=\lambda_2$ (wavelength on the longer wavelength side of $\lambda_0$). In this way, a value of $\lambda$ (wavelength center) of gravity shifts (wavelength shift) based on the amount of transmitted light and the amount of reflected light.

Note that a method of deriving the wavelength center of gravity is not limited to the above description. For example, since $\lambda$ (wavelength center of gravity) is proportional to x below, the wavelength center of gravity may be derived from the following Equations (2) and (3). In the following Equation (3), $I_T$ denotes the amount of transmitted light, and $I_R$ denotes the amount of reflected light. Further, when a spectral shape of a measurement target and line formation of the inclined dichroic mirror 22 are ideal shapes, parameters a and b in Equation (2) may be determined by the optical characteristics of the inclined dichroic mirror 22.

$$\lambda = ax + b \tag{2}$$

$$x = I_T - I_R/2(I_T + I_R) \tag{3}$$

Note that actually, there are differences (individual differences) in the spectral characteristics between the optical system and the camera, and thus for the purpose of correcting the differences, for example, x may be derived by the following Equation (4) using the signal strength of a substrate whose reflection characteristics are known as a reference. In the following Equation (4), $I_{Tr}$ denotes the amount of transmitted light in the reference, and $I_{Rr}$ denotes the amount of reflected light in the reference.

$$x = (I_T/I_{Tr} - I_R/I_{Rr})/2(I_T/I_{Tr} + I_R/I_{Rr}) \tag{4}$$

Further, x may be derived by the following Equation (5) using the signal amount in a non-reflective state for the purpose of removing an influence of direct light from the light source. In the following Equation (5), $I_{Tb}$ denotes the amount of transmitted light in the non-reflective state, and $I_{Rb}$ denotes the amount of reflected light in the non-reflective state.

$$x = \{(I_T - I_{Tb})/(I_{Tr} - I_{Tb}) - (I_R - I_{Rb})/(I_{Rr} - I_{Rb})\}/2\{(I_T - I_{Tb})/(I_{Tr} - I_{Tb}) + (I_R - I_{Rb})/(I_{Rr} - I_{Rb})\} \tag{5}$$

Further, in order to comprehensively perform various corrections of film characteristics, irradiation spectrum, non-linearity of the inclined dichroic mirror 22, etc., the wavelength center of gravity ($\lambda$) may be approximated by a polynomial shown in the following Equation (6). Note that each of parameters a, b, c, d, and e in the following Equation (6) is determined, for example, by measuring a plurality of samples having different wavelength centers of gravity (film thicknesses).

$$\lambda = ax^4 + bx^3 + cx^2 + dx + e \tag{6}$$

Figure 6:
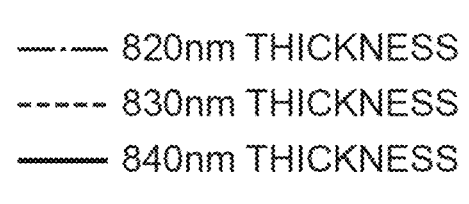
FIG. 6 is a diagram illustrating a relationship between a wavelength and a film thickness.
Figure 6:
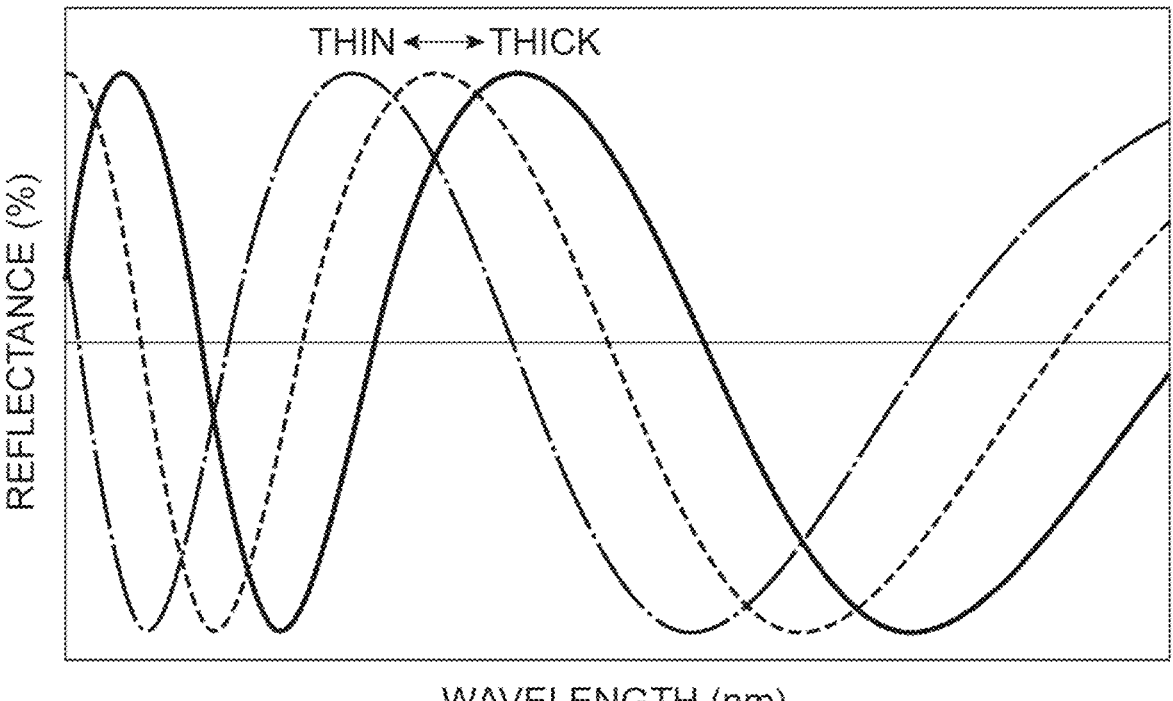

FIG. 6 is a diagram for describing a principle of film thickness measurement. In FIG. 6, the horizontal axis indicates the wavelength and the vertical axis indicates the reflectance. In an example illustrated in FIG. 6, the relationship between the wavelength and the reflectance is illustrated for each of an example having a film thickness of 820 nm, an example having a film thickness of 830 nm, and an example having a film thickness of 840 nm. As illustrated in FIG. 6, the wavelength center of gravity differs depending on the difference in film thickness. Therefore, by specifying the wavelength center of gravity, it is possible to estimate the film thickness.

Figure 7:
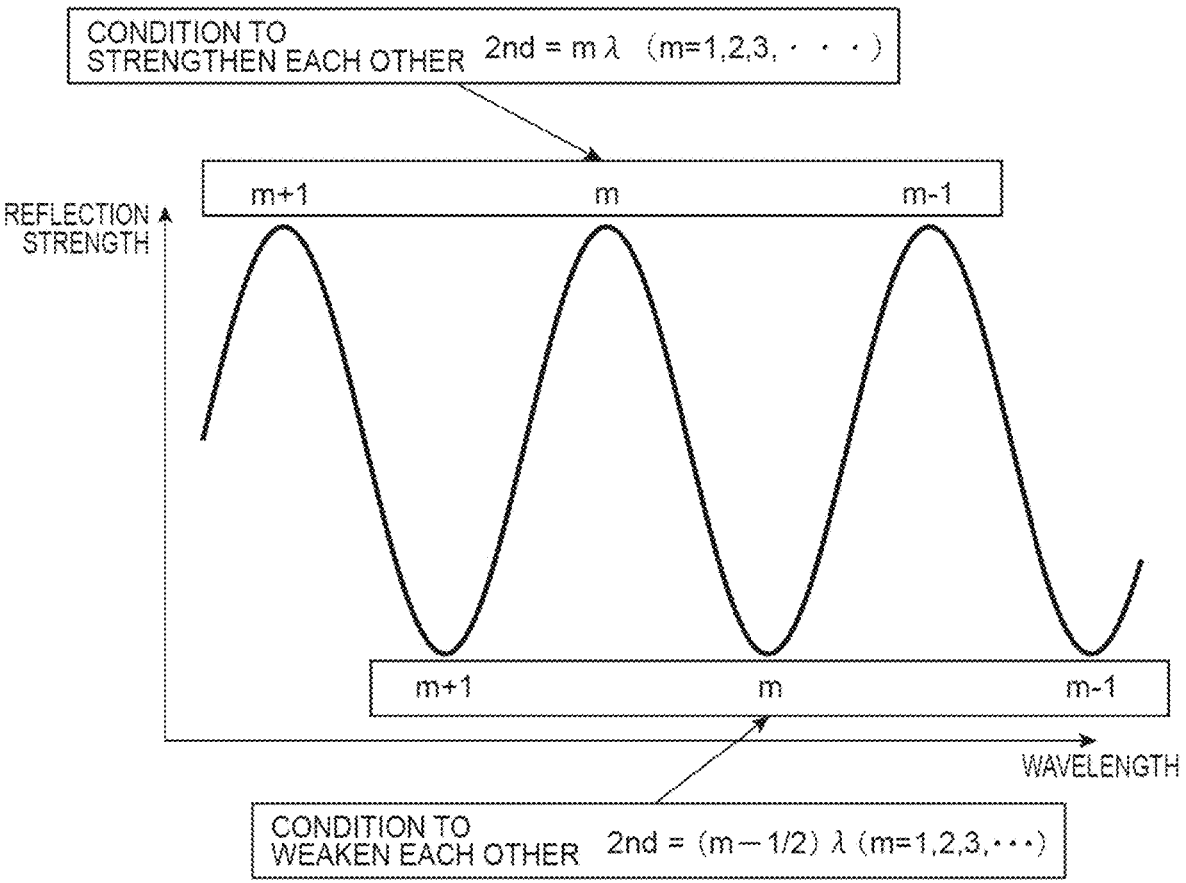
FIG. 7 is a diagram for describing a principle of film thickness measurement.

The relationship between the wavelength and the film thickness may be described by the following Equation (7) as illustrated in FIG. 7. In the following Equation (7), n denotes a refractive index of a film, d denotes a film thickness, in denotes a positive integer (1, 2, 3, . . . ), and $\lambda$ denotes a wavelength center of gravity. 2nd denotes an optical path difference (optical path difference caused by arrangement of a film). The control apparatus 30 estimates a film thickness corresponding to each pixel from a wavelength center of gravity of each pixel based on the following Equation (7).

$$2nd = m\lambda(m=1, 2, 3, . . . )(\text{condition to strengthen each other})$$

$$2nd = m\lambda(m=1, 2, 3, . . . )(\text{condition to weaken each other}) \tag{7}$$

Figure 8:
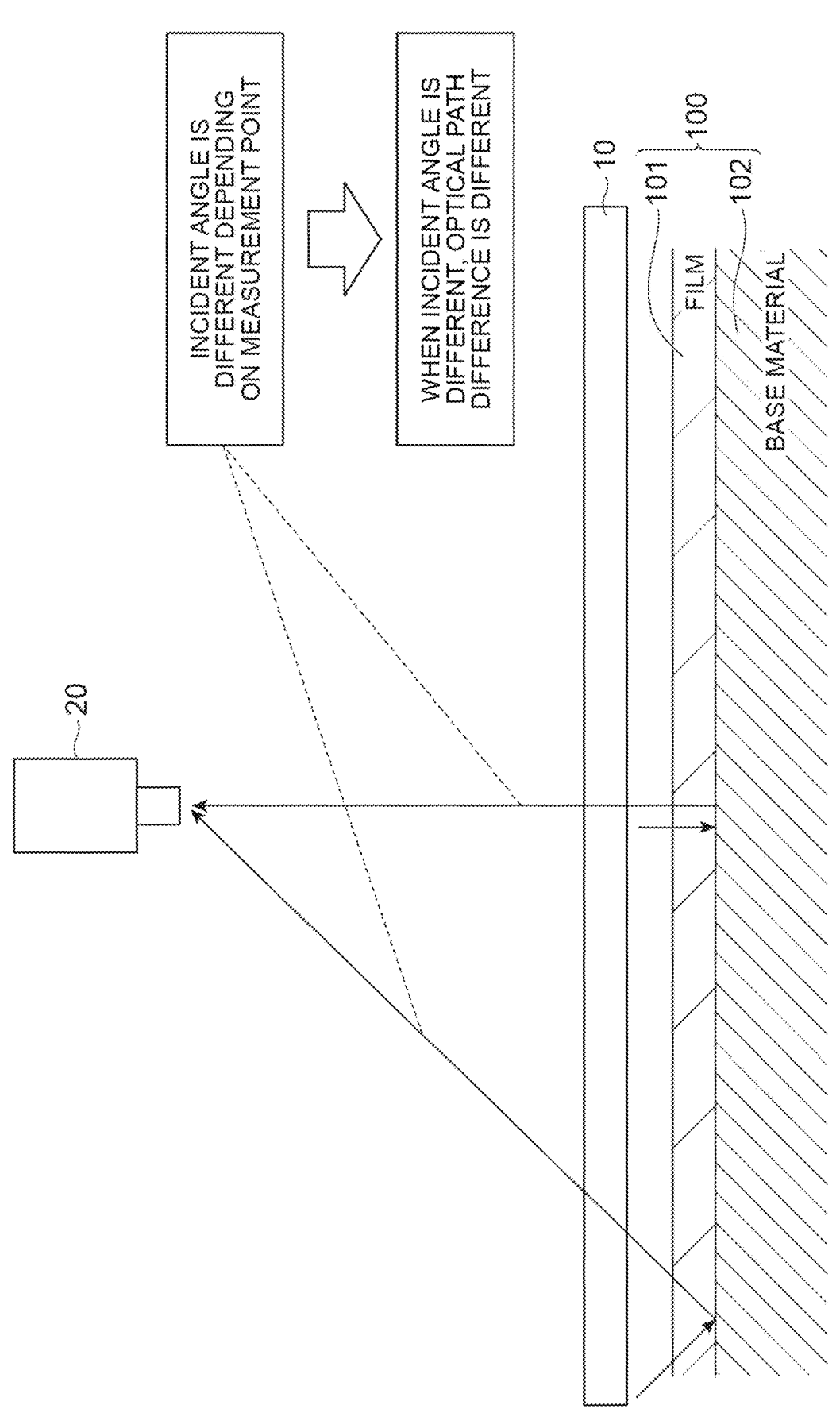
FIG. 8 is a diagram for describing a difference in incident angle of light with respect to a camera system.

Here, Equation (7) indicating the relationship between the wavelength and the film thickness described above is satisfied when light is vertically incident on the sample 100. On the other hand, when light is not vertically incident on the sample 100, the above Equation (7) is not satisfied. That is, as illustrated in FIG. 8, when light is incident on the sample 100 in which a film 101 is disposed on a surface of a base material 102, an incident angle of light is different depending on the measurement point and the optical path difference is different, and thus the film thickness cannot be uniformly estimated with high accuracy by the above Equation (7). Therefore, in order to estimate the film thickness with high accuracy at any measurement point (incident angle), calculation (correction processing) according to the measurement point (incident angle) is necessary.

Figure 9:
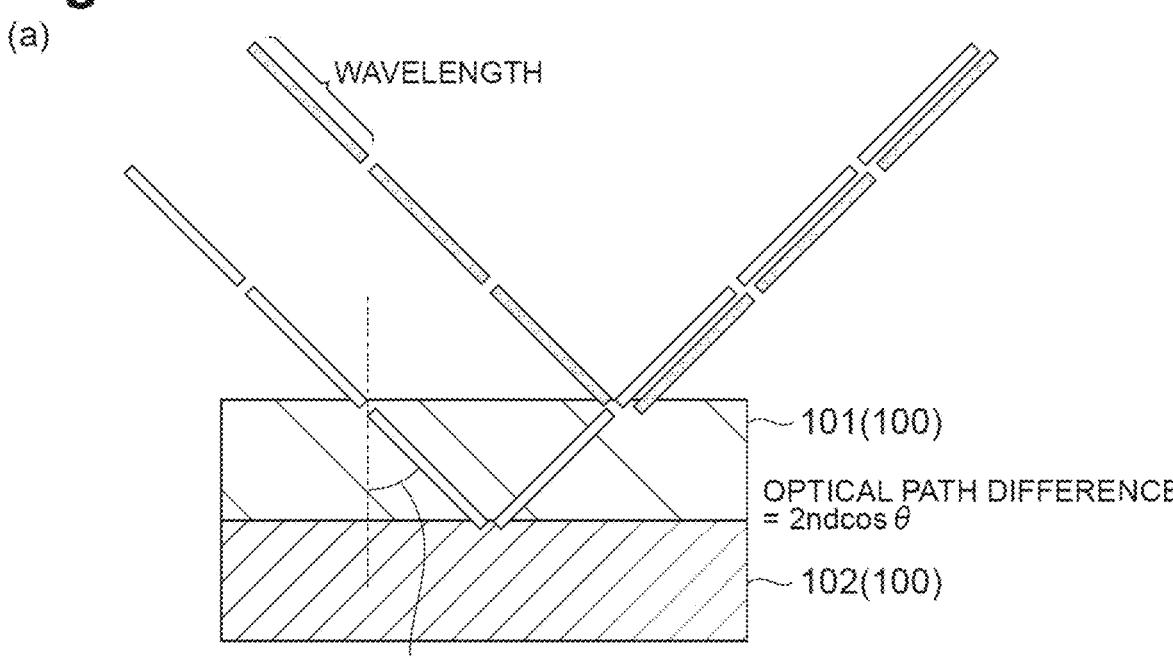
FIG. 9 is a diagram for describing correction of a film thickness measured value.
Figure 9:
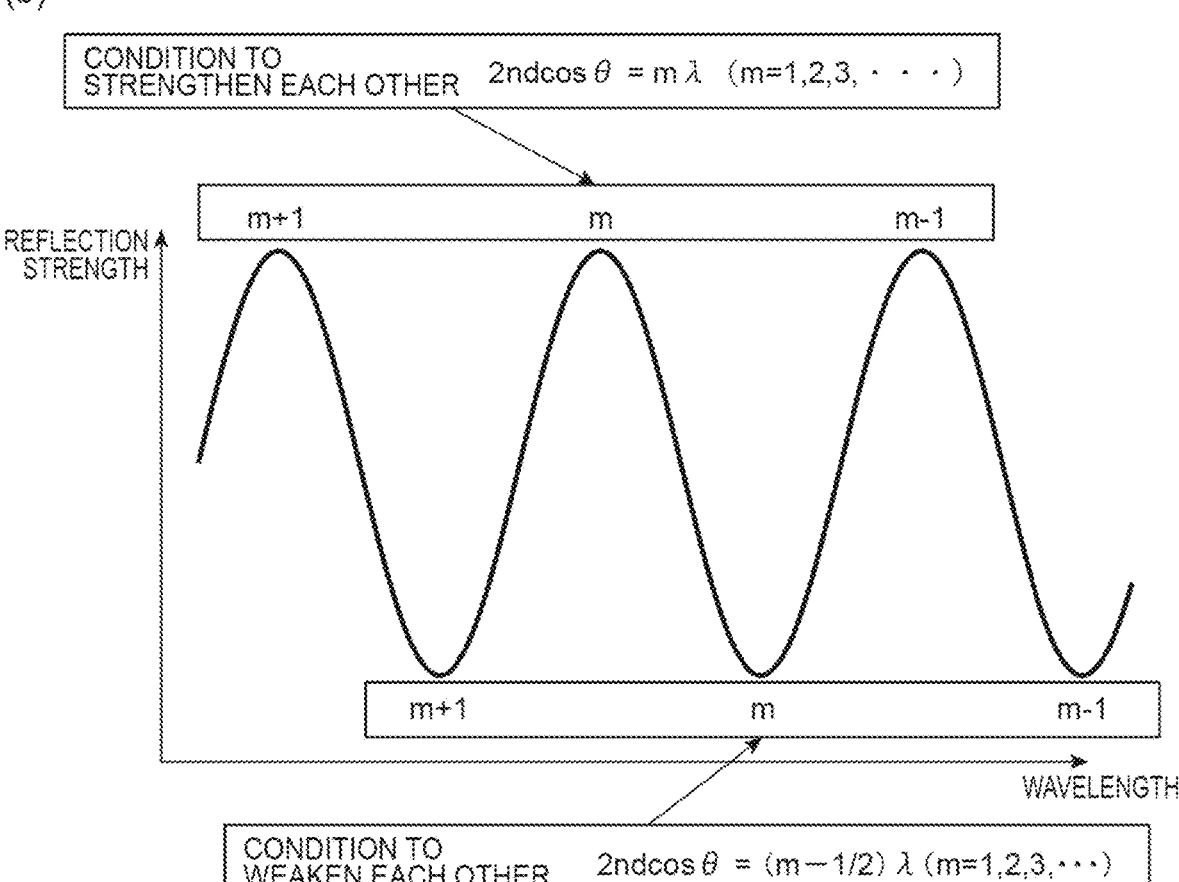

FIG. 9 is a diagram for describing correction of a film thickness measured value. As illustrated in FIG. 9(a), when the incident angle of light is $\theta$, the optical path difference is indicated by 2nd $\cos\theta$. In this way, the relationship between the wavelength and the film thickness in consideration of the incident angle $\theta$ may be described by the following Equation (8) as illustrated in FIG. 9(b). The control apparatus 30 estimates the film thickness according to the measurement point (incident angle) based on the following Equation (8). As described above, the control apparatus 30 may estimate the film thickness from the wavelength center of gravity by further considering an angle of light applied to the sample 100.

$$2nd \cos\theta = m\lambda(\text{condition to strengthen each other})$$

$$2nd \cos\theta = (m-\frac{1}{2})\lambda(\text{condition to weaken each other}) \tag{8}$$

As described above, the film thickness measuring apparatus 1 implements a film thickness measuring method. The film thickness measuring method includes, for example, a first process of irradiating the sample 100 with light in a planar shape, a second process of photographing light separated by the inclined dichroic mirror 22 that has the transmittance and reflectance changing according to wavelengths in a predetermined wavelength range and separates light from the sample 100 by transmitting and reflecting the light, and a third process of deriving a wavelength based on a photographing result and estimating a film thickness of the sample 100 based on the wavelength.

Next, the action and effect of the present embodiment will be described.

The film thickness measuring apparatus 1 according to the present embodiment includes the light source 10 that irradiates the sample 100 with light in a planar shape, the inclined dichroic mirror 22 that has the transmittance and reflectance changing according to wavelengths in a predetermined wavelength range and separates light from the sample 100 by transmitting and reflecting the light, the area sensors 23 and 24 that photograph light separated by the inclined dichroic mirror 22, and the control apparatus 30 that estimates the film thickness of the sample 100 based on signals from the area sensors 23 and 24 photographing light, and the light source 10 emits light having a wavelength included in a predetermined wavelength range of the inclined dichroic mirror 22.

In the film thickness measuring apparatus 1 according to the present embodiment, the sample 100 is irradiated with light having a wavelength included in a predetermined wavelength range of the inclined dichroic mirror 22 in a plane shape. Then, in the film thickness measuring apparatus 1 according to the present embodiment, the inclined dichroic mirror 22 separates light from the sample 100 by transmitting and reflecting the light. Here, the inclined dichroic mirror 22 has the transmittance and reflectance changing according to wavelengths in the predetermined wavelength region. Therefore, a ratio of transmitted light and a ratio of reflected light to light separated by the inclined dichroic mirror 22 change depending on the wavelength. Then, the separated light is photographed by the area sensors 23 and 24, so that the ratio of the transmitted light and the ratio of the reflected light may be specified, and as a result, the wavelength may be specified. Further, in the control apparatus 30, the film thickness of the sample 100 is estimated based on signals from the area sensors 23 and 24. When the film thickness can be estimated based on information indicating the wavelength, as described above, the wavelength is specified from photographing results of the area sensors 23 and 24, and thus the film thickness of the sample 100 can be estimated with high accuracy by considering a signal including information of the wavelength (signals from the area sensors 23 and 24). Then, in the film thickness measuring apparatus 1 according to the present embodiment, the sample 100 is irradiated with light in a planar shape, and an in-plane film thickness of the sample 100 is estimated at the same time according to light from the sample 100. Thus, when compared to the case where the in-plane film thickness is estimated while a light irradiation range is changed by a point sensor, line scan, etc., it is possible to estimate an in-plane film thickness distribution at high speed. As described above, according to the film thickness measuring apparatus 1 according to the present embodiment, the film thickness of the sample 100 can be measured at high speed.

Figure 10:
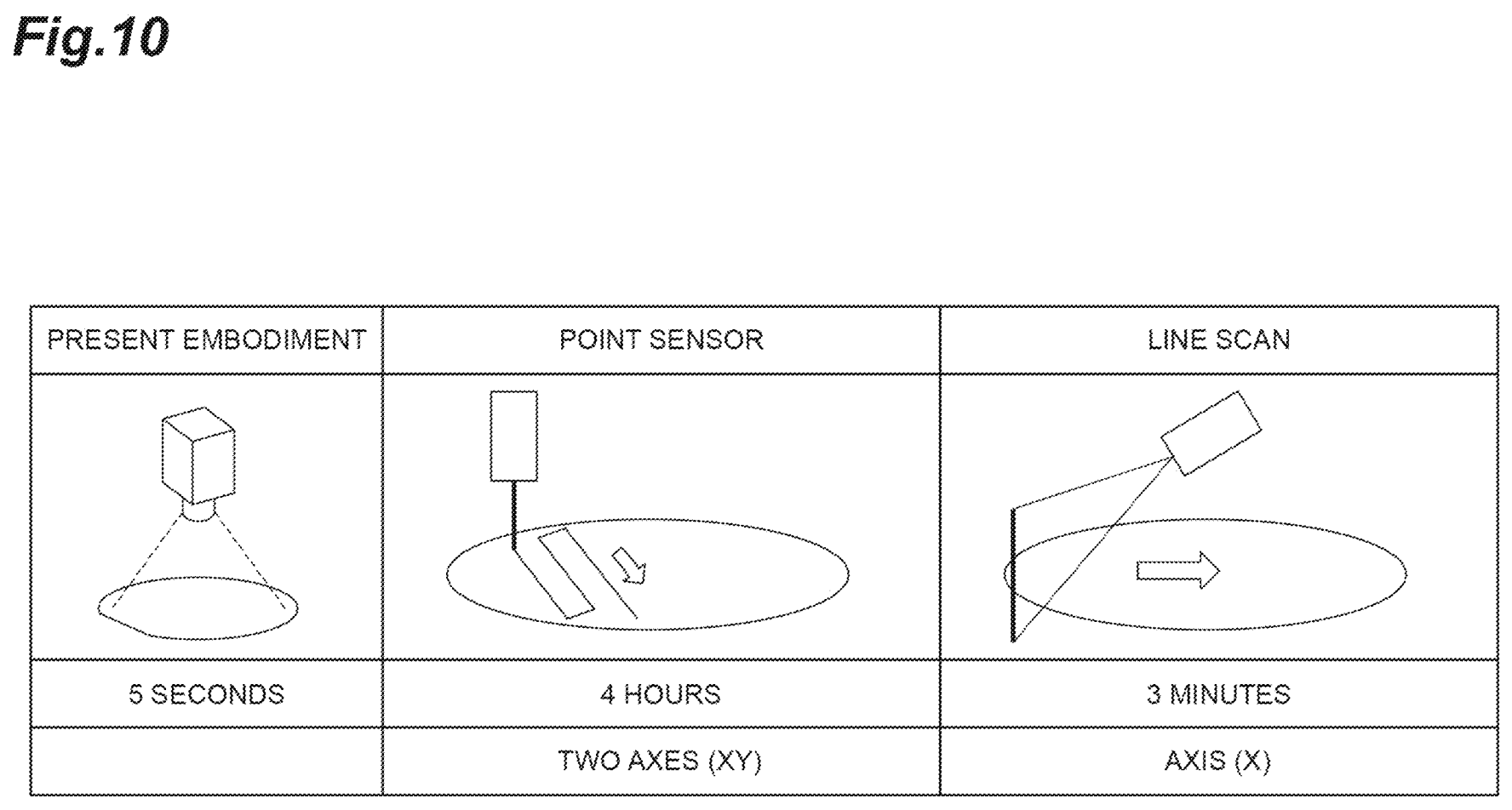

FIG. 10 is a diagram illustrating a comparison result between the film thickness measuring apparatus 1 according to the present embodiment and a comparative example. As illustrated in FIG. 10, when the film thickness is measured point by point by the point sensor, a measurement time is, for example, about 4 hours. Note that the 4 hours here is, for example, a measurement time when about 16000 points are detected. Further, as illustrated in FIG. 10, when the film thickness is measured line by line by the line scan, a measurement time is, for example, about 3 minutes. On the other hand, as illustrated in FIG. 10, in the film thickness measuring apparatus 1 according to the present embodiment, the sample 100 is irradiated with light in a planar shape, and an in-plane film thickness is measured collectively (at the same time). Therefore, a measurement time is about 5 seconds. As described above, the film thickness measuring apparatus 1 according to the present embodiment may estimate an in-plane film thickness distribution at high speed when compared with the point sensor, the line scan, etc. according to the comparative example. Note that, in the film thickness measuring apparatus 1 according to the present embodiment, an error between a measurement result and an actual film thickness may be 0.1% or less. As described above, the film thickness measuring apparatus 1 according to the present embodiment may achieve both reduction of the measurement time related to the film thickness and improvement of the measurement accuracy. Further, while a configuration related to the point sensor and the line scan is difficult to be in-line (mounted on the apparatus), the film thickness measuring apparatus 1 according to the present embodiment can easily be in-line.

In the film thickness measuring apparatus 1, the control apparatus 30 may estimate the film thickness corresponding to each pixel based on wavelength information of each pixel in the area sensors 23 and 24. According to such a configuration, the film thickness distribution on the irradiation surface of the sample 100 may be more specifically estimated (for each pixel).

In the film thickness measuring apparatus 1, the control apparatus 30 may estimate the film thickness by further considering an angle of light applied to the sample 100. Since the optical path changes when the angle of light applied to the sample 100 changes, it may be impossible to estimate the film thickness with high accuracy from information of only the wavelength. In this regard, by further considering the angle of light applied to the sample 100, the film thickness may be estimated with higher accuracy according to the actual optical path. Specifically, the film thickness is estimated using the above-mentioned Equation (8).

In the film thickness measuring apparatus 1, the light source 10 may irradiate the sample 100 with diffused light. As a result, the surface of the sample 100 may be uniformly irradiated with light.

In the film thickness measuring apparatus 1, the light source 10 may have the light guide plate 10d (see FIG. 2(a)) that generates diffused light. As a result, the surface of the sample 100 may be uniformly irradiated with light using a compact configuration.

The film thickness measuring apparatus 1 may further include the bandpass filters 25 and 26 disposed between the inclined dichroic mirror 22 and the area sensors 23 and 24. As a result, light outside a desired wavelength range may be removed, and accuracy of film thickness estimation may be improved.

The film thickness measuring method according to the present embodiment is carried out by the film thickness measuring apparatus 1, and includes a first process of irradiating the sample 100 with light in a planar shape, a second process of photographing light separated by the inclined dichroic mirror 22 that has the transmittance and reflectance changing according to wavelengths in a predetermined wavelength range and separates light from the sample 100 by transmitting and reflecting the light, and a third process of deriving a wavelength based on a photographing result and estimating a film thickness of the sample 100 based on the wavelength. According to such a film thickness measuring method, the film thickness of the sample 100 may be measured at high speed.

Figure 11:
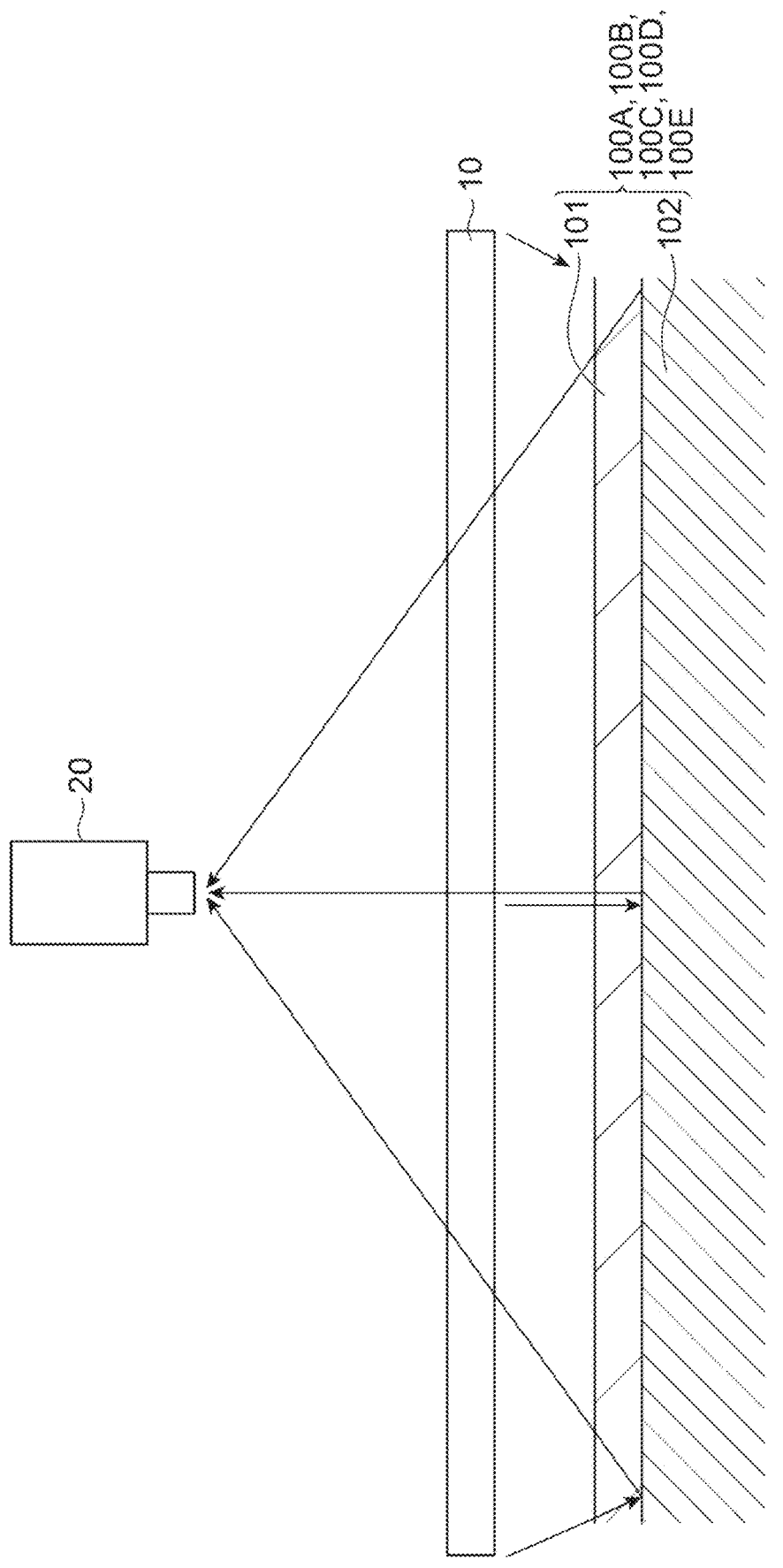
FIG. 11 is a diagram for describing a film thickness measuring apparatus according to a modification.

Even though the embodiment of the invention has been described above, the invention is not limited to the embodiment. The film thickness measuring apparatus 1 may be applied to film thickness measurement of various samples 100. As illustrated in FIG. 11, as the sample 100, it is possible to consider a semiconductor element 100A, a flat panel display 100B, a film member 100C, an electronic component 100D, another component 100E other than the electronic component, etc.

That is, the film thickness measuring apparatus 1 may measure a thickness of the film 101 formed on the base material 102, which is a wafer, for the semiconductor element 100A. In this case, as an apparatus configuration, a wafer transfer and holding mechanism including an arm, a cassette, a hoop, a conveyor, a moving stage, etc. is used.

Further, the film thickness measuring apparatus 1 may measure the thickness of the film 101 formed on the base material 102 made of glass, film, sheet, etc. for the flat panel display 100B. In this case, as an apparatus configuration, a transfer and holding mechanism including an arm, a glass stand, a conveyor, a moving stage, etc. is used.

Figure 12:
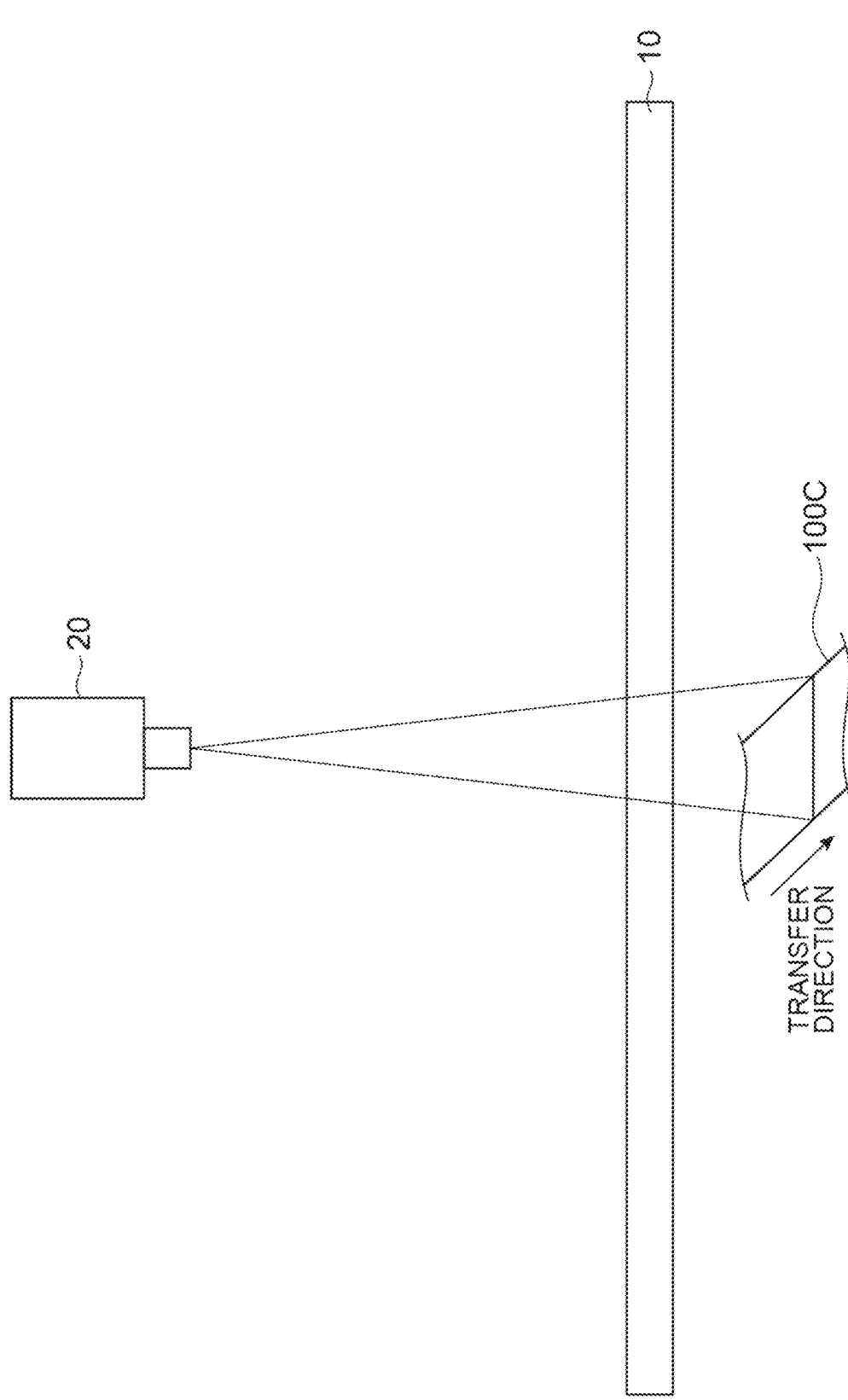
FIG. 12 is a diagram for describing a film thickness measuring apparatus according to a modification.

Further, the film thickness measuring apparatus 1 may measure the thickness of the film 101 formed on the base material 102 made of glass, film, sheet, etc. for the film member 100C. In this case, as an apparatus configuration, a transfer and holding mechanism including an arm, a glass stand, a conveyor, a moving stage, etc. is used. Note that for the film member 100C, for example, as illustrated in FIG. 12, the film thickness of the entire member 100C may be measured by continuously photographing the film member 100C transferred in one direction and connecting photographing regions to each other.

Further, the film thickness measuring apparatus 1 may measure the thickness of the film 101 formed on the base material 102, which is a substrate, for the electronic component 100D. In this case, as an apparatus configuration, a wafer transfer and holding mechanism including an arm, a cassette, a hoop, a conveyor, a sample table, a moving stage, etc. is used.

Further, the film thickness measuring apparatus 1 may measure the thickness of the film 101 formed on the base material 102, which is a substrate, for the component 100E. A film of the component 100E is, for example, a thin film of a molded product, etc., and film thickness measurement in this case is, for example, measurement of a thin film coat thickness. As an apparatus configuration, a wafer transfer and holding mechanism including an arm, a cassette, a hoop, a conveyor, a sample table, a moving stage, etc. is used.

Figure 13:
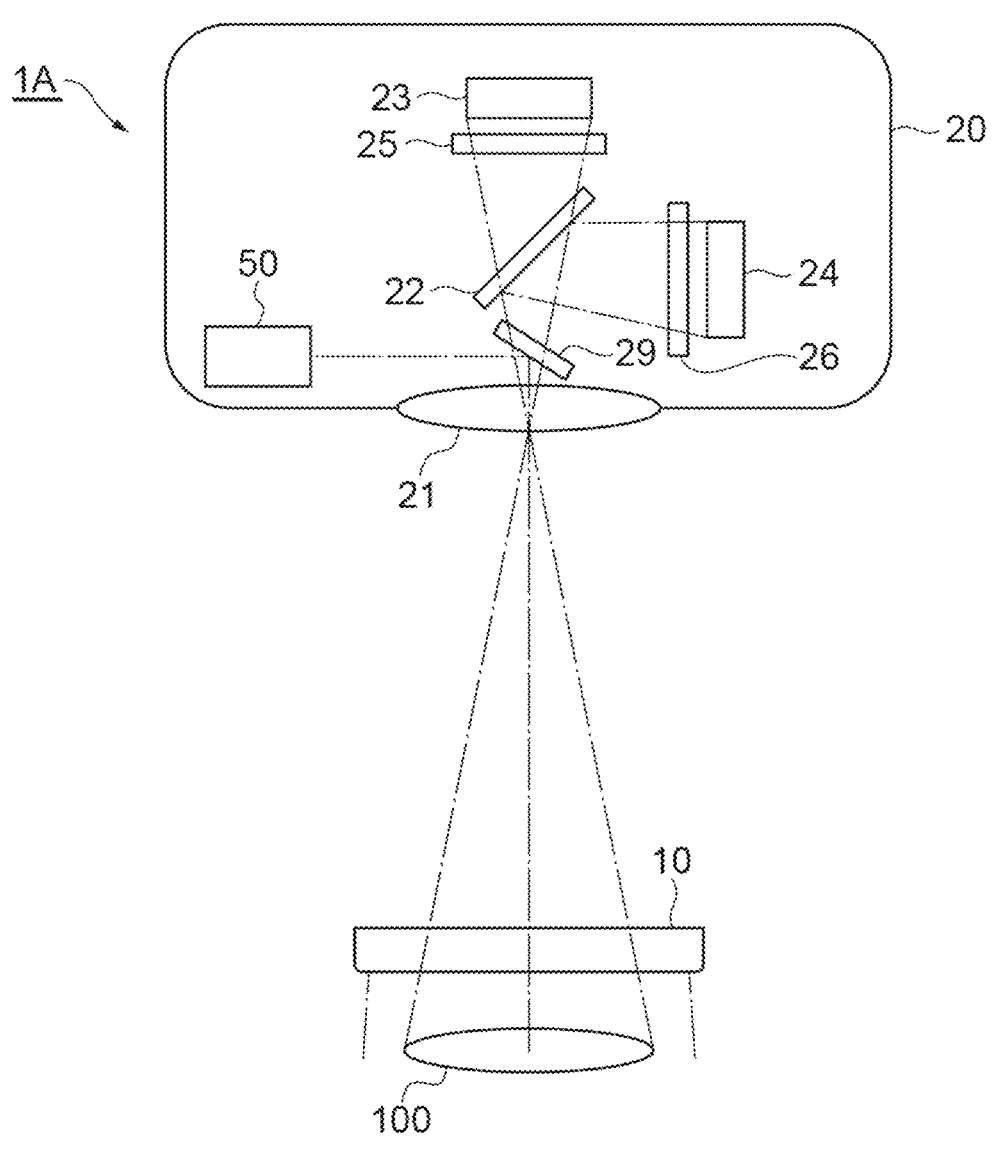
FIG. 13 is a diagram schematically illustrating a film thickness measuring apparatus according to a modification.

In addition, the relative film thickness distribution is derived by the above-mentioned film thickness measurement. However, additionally, by detecting spectral information (reference spectral information) at a certain point of the sample 100, it is possible to derive each absolute value of a film thickness of each area based on a relative film thickness distribution and reference spectral information. FIG. 13 is a diagram schematically illustrating a film thickness measuring apparatus 1A according to a modification. The film thickness measuring apparatus 1A includes a half mirror 29 and a spectroscope 50 in addition to each configuration of the film thickness measuring apparatus 1 described in the embodiment. The half mirror 29 reflects, for example, one point of light near a center of the sample 100. The spectroscope 50 acquires reference spectral information which is spectroscopy spectral data of light at the one point. By acquiring the reference spectral information in this way, a value of m in Equations (7) and (8) is determined, and not only the relative amount of change in the film thickness but also the absolute value of the film thickness in each area may be derived. Note that a method for measuring the absolute value of the film thickness is not limited to the above method.

REFERENCE SIGNS LIST

1, 1A: film thickness measuring apparatus, 10: light source (light irradiation unit), 10d: light guide plate, 22: inclined dichroic mirror, 23, 24: area sensor (imaging unit), 25, 26: bandpass filter, 30: control apparatus (analysis unit), 100: sample (object).

The invention claimed is:

1. A film thickness measuring apparatus comprising:
a light irradiator configured to irradiate an object with light in a planar shape;
an optical filter having a transmittance linearly changing according to wavelengths in a predetermined wavelength range, the optical filter being configured to separate light from the object by transmitting and reflecting the light;
an imager configured to photograph light separated by the optical filter; and
an analyzer configured to estimate a film thickness of the object based on a signal from the imager photographing light,
wherein the light irradiator emits light having a wavelength comprised in the predetermined wavelength range of the optical filter,
wherein the imager includes a first area sensor configured to capture an image of light transmitted through the optical element and to output the transmitted image, and a second area sensor configured to capture an image of light reflected through the optical element and to output the reflected image, and
wherein the analyzer calculates a wavelength center for each pixel based on a value of each pixel corresponding to the transmitted image and the reflected image, and estimates a film thickness corresponding to each pixel.

2. The film thickness measuring apparatus according to claim 1, wherein the analyzer estimates a film thickness by further considering an angle of light with which the object is irradiated.

3. The film thickness measuring apparatus according to claim 1, wherein the light irradiator irradiates the object with diffused light.

4. The film thickness measuring apparatus according to claim 3, wherein the light irradiator has a light guide plate configured to generate the diffused light.

5. The film thickness measuring apparatus according to claim 1, further comprising a bandpass filter disposed between the optical filter and the imager.

6. A film thickness measuring method comprising:
irradiating an object with light in a planar shape;
photographing with an imager light separated by an optical filter, the optical filter having a transmittance linearly changing according to wavelengths in a predetermined wavelength range and being configured to separate light from the object by transmitting and reflecting the light; and
deriving with an analyzer a wavelength based on a photographing result and estimating a film thickness of the object based on the wavelength,
wherein the imager includes a first area sensor configured to capture an image of light transmitted through the optical filter and to output the transmitted image, and a second area sensor configured to capture an image of light reflected through the optical filter and to output the reflected image, and
wherein the analyzer calculates a wavelength center for each pixel based on a value of each pixel corresponding to the transmitted image and the reflected image, and estimates a film thickness corresponding to each pixel.

* * * * *